US008788258B1

(12) United States Patent
Bangalore et al.

(10) Patent No.: US 8,788,258 B1
(45) Date of Patent: Jul. 22, 2014

(54) MACHINE TRANSLATION USING GLOBAL LEXICAL SELECTION AND SENTENCE RECONSTRUCTION

(75) Inventors: Srinivas Bangalore, Morristown, NJ (US); Patrick Haffner, Atlantic Highlands, NJ (US); Stephan Kanthak, Chatham, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1561 days.

(21) Appl. No.: 11/686,681

(22) Filed: Mar. 15, 2007

(51) Int. Cl.
*G06F 17/28* (2006.01)

(52) U.S. Cl.
USPC ................. 704/4; 704/2; 704/7; 704/8; 704/9

(58) Field of Classification Search
USPC ...................................................... 704/1–10
See application file for complete search history.

(56) References Cited

U.S. PATENT DOCUMENTS

| | | | | |
|---|---|---|---|---|
| 6,278,967 | B1 * | 8/2001 | Akers et al. | 704/2 |
| 6,360,196 | B1 * | 3/2002 | Poznanski et al. | 704/8 |
| 6,760,695 | B1 * | 7/2004 | Kuno et al. | 704/9 |
| 6,885,985 | B2 * | 4/2005 | Hull | 704/2 |
| 6,947,885 | B2 * | 9/2005 | Bangalore et al. | 704/1 |
| 7,200,550 | B2 * | 4/2007 | Menezes et al. | 704/10 |
| 7,353,165 | B2 * | 4/2008 | Zhou et al. | 704/5 |
| 7,454,326 | B2 * | 11/2008 | Marcu et al. | 704/2 |

OTHER PUBLICATIONS

Kumar, Shankar, Yonggang Deng, and William Byrne. "A Weighted Finite State Transducer Translation Template Model for Statistical Machine Translation." Natural Language Engineering 1.1: 1-41. 2004.*

Zhou, Bowen, S. Chen, and Yuqing Gao. "Constrained phrase-based translation using weighted finite-state transducers." Proc. ICASSP'05. 2005.*

Hiyan Alshawi et al. "Automatic Acquisition of Hierarchical Transduction Models for Machine Translation." In ACL 1998, Montreal, Canada.

Srinivas Bangalore et al. "Supertagging: An Approach to Almost Parsing." Computational Linguistics, 25(2), 1999.

Adam L. Berger et al. "A Maximum Entropy Approach to Natural Language Processing." Computational Linguistics, 22(1):39-71, 1996.

Peter F. Brown et al. "The Mathematics of Statistical Machine Translation: Parameter Estimation" Computational Linguistics, 16(2):263-312, 1993.

David Chiang "A Hierarchical Phrase-Based Model for Statistical Machine Translation." In Proceedings of the ACL Conference 2005, Ann Arbor, MI.

Brooke Cowan et al. "A Discriminative Model for Tree-to-Tree Translation." In Proceedings of EMNLP 2006.

Hal Daume III et al. "Search-based Structured Prediction." Submitted to Machine Learning Journal 2007.

Miroslav Dudik et al. "Performance Guarantees for Regularized Maximum Entropy Density Estimation." In Proceedings of COLT2004, Banff, Canada. Springer Verlag.

(Continued)

*Primary Examiner* — Shaun Roberts

(57) ABSTRACT

Disclosed are systems, methods, and computer-readable media for performing translations from a source language to a target language. The method comprises receiving a source phrase, generating a target bag of words based on a global lexical selection of words that loosely couples the source words/phrases and target words/phrases, and reconstructing a target phrase or sentence by considering all permutations of words with a conditional probability greater than a threshold.

21 Claims, 6 Drawing Sheets

(56) References Cited

OTHER PUBLICATIONS

V. Goffin et al. "The AT&T Watson Speech Recognizer." In Proceedings of ICASSP 2005, Philadelphia, PA.
Patrick Haffner "Fast Transpose Methods for Kernel Learning on Sparse Data." In ICML'06: Proceedings of the 23rd international conference on Machine learning, pp. 385-392.
Hany Hassan et al. "Syntactic Phrase-Based Statistical Machine Translation." In Proceedings of IEEE/ACL first International Workshop on Spoken Language Technology (SLT), Aruba, Dec. 2006.
Thorsten Joachims "Training Linear SVMs in Linear Time." In Presented at the Learning Workshop, Snowbird, Utah, to be published, 2006.
Stephan Kanthak et al. "Novel Reordering Approaches in Phrase-Based Statistical Machine Translation." In Proceedings of the ACL Workshop on Building and Using Parallel Texts, pp. 167-174, Ann Arbor, Michigan, 2006.
John Lafferty et al. "Conditional Random Fields: Probabilistic Models for Segmenting and Labeling Sequence Data." In Proceedings of ICML, San Francisco, CA. 2001.
Robert Malouf "A Comparison of Algorithms for Maximum Entropy Parameter Estimation." In Proceedings of CoNLL-2002, pp. 49-55. Taipei, Taiwan.
I. Dan Melamed "Statistical Machine Translation by Parsing." In Proceedings of ACL 2004.
Franz Josef Och et al. "Discriminative Training and Maximum Entropy Models for Statistical Machine Translation." In Proceedings of ACL 2002.
Franz Josef Och et al. "A Systematic Comparison of Various Statistical Alignment Models." Computational Linguistics, 29(1):19-51, 2003.
Ryan Rifkin et al. "In Defense of One-Vs-All Classification." Journal of machine Learning Research, pp. 101-141, 2004.
Andreas Stolcke "SRILM—An Extensible Language Modeling Toolkit." In Proc. Intl. Conf. Spoken Language Processing, 2002.
Dekai Wu "Stochastic Inversion Transduction Grammars and Bilingual Parsing of Parallel Corpora." Computational Linguistics, 23(3):377-404, 1997.
Kenji Yamada et al. "A Syntax-based Statistical Translation Model." In Proceedings of 39th ACL, 2001.
Richard Zens et al. "Improvements in Phrase-Based Statistical Machine Translation." In Proceedings of HLT-NAACL, pp. 257-264, Boston, MA, 2004.
Hao Zhang et al. "Stochastic Lexicalized Inversion Transduction Grammar for Alignment. " In Proceedings of ACL, 2005.

* cited by examiner

```
English: I need to make a collect call
Japanese: 私は コレクト コールを かける 必要があります
Alignment: 1 5 0 3 0 2 4
```

```
I:私は  need:必要があります  to:∈  make:コールを
    a:∈  collect:コレクト  call:かける
```

MACHINE TRANSLATION USING GLOBAL LEXICAL SELECTION AND SENTENCE RECONSTRUCTION

RELATED APPLICATIONS

This case is related to commonly assigned U.S. patent application Ser. No. 11/646,983, filed Dec. 28, 2006, and U.S. patent application Ser. No. 11/647,080, filed Dec. 28, 2006, the contents of which are incorporated herein by reference.

BACKGROUND OF THE INVENTION

1. Field of the Invention

The present invention relates to language translation and more specifically to machine translation when target words are associated with the entire source sentence without the need to compute local associations between source words and target words.

2. Introduction

The problem of machine translation can be viewed as consisting of two subproblems: (a) lexical selection, where appropriate target language lexical items are chosen for each source language lexical item and (b) lexical reordering, where the chosen target language lexical items are rearranged to produce a meaningful target language string. Most of the previous work on statistical machine translation employs a word-alignment algorithm that provides local associations between source words and target words. See, e.g., Brown, Pietra, Pietra, and Mercer, "The Mathematics of Machine Translation: Parameter Estimation," *Computational Linguistics*, 16(2):263-312, 1993, incorporated herein by reference. The source-to-target word alignments are sometimes augmented with target-to-source word alignments in order to improve the precision of these local associations. Further, the word-level alignments are extended to phrase-level alignments in order to increase the extent of local associations. The phrasal associations compile some amount of (local) lexical reordering of the target words—those permitted by the size of the phrase. Most of the state-of-the-art machine translation systems use these phrase-level associations in conjunction with a target language model to produce the target sentence. There is almost no emphasis on lexical reordering other than the local reorderings permitted within the phrasal alignments. A few exceptions are the hierarchical (possibly syntax-based) transduction models and the string transduction model. Examples of hierarchical transduction models can be found in the following papers: Wu, "Stochastic Inversion Transduction Grammars and Bilingual Parsing of Parallel Corpora," *Computational Linguistics*, 23(3): 377-404, 1997; Alshawi, Bangalore, and Douglas, "Automatic acquisition of hierarchical transduction models for machine translation," *ACL*, 1998; Yamada and Knight, "A syntax-based statistical translation model," *Proceedings of 39 ACL*, 2001; and Chiang, "A hierarchical phrase-based model for statistical machine translation," *Proceedings of the ACL Conference*, 2005, incorporated herein by reference. For an example of a string transduction model, see Kanthak, Vilar, Matusov, Zens, and Ney, "Novel reordering approaches in phrase-based statistical machine translation," *Proceedings of the ACL Workshop on Building and Using Parallel/Texts*, 2005, incorporated herein by reference.

Focusing on information associated with local reordering in the context of language translation can ignore other sources of information which may provide a benefit in improving the product of translation. Therefore, what is needed in the art is an improved method of providing machine translations.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Disclosed herein are systems, methods and computer-readable media for providing a machine translation from a source language to a target language. Machine translation of a source language sentence involves selecting appropriate target language words and ordering the selected words to form a well-formed target language sentence. Most of the previous work on statistical machine translation relies on (local) associations of target words/phrases with source words/phrases for lexical selection. In contrast, the disclosure contained herein presents a novel approach to lexical selection where the target words are associated with the entire source sentence (i.e. a global approach) without the need to compute local associations. Further, the disclosure presents a technique for reconstructing the target language sentence from the selected words. The results of this approach are compared against those obtained from a finite-state based statistical machine translation system which relies on local lexical associations.

The method embodiment of the invention provides a method of machine translation from a source language to a target language. The steps of the method comprise receiving a source phrase, generating a target bag of words based on a global lexical selection of words that loosely couple the source words/phrases and target words/phrases and reconstructing a target phrase or sentence by considering all permutations of words for the conditional probability greater than a threshold.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

The invention relates to an alternate approach to lexical selection and lexical reordering. For lexical selection, in contrast to the local approaches of associating target words to source words, the inventors associate the target words to the entire source sentence. The intuition is that there may be lexico-syntactic features of the source sentence (not necessarily a single source word) that might trigger the presence of a target word in the target sentence. Furthermore, it might be difficult to exactly associate a target word to a source word in many situations such as (a) when the translations are not exact but paraphrases and (b) when the target language does not have one lexical item to express the same concept that is expressed by a source word. The extensions of word alignments to phrasal alignments attempt to address some of these situations in addition to alleviating the noise in word-level alignments.

As a consequence of the global lexical selection approach, there is no longer a tight association between source language words/phrases and target language words/phrases. The result of lexical selection is simply a bag of words (or phrases) in the target language. The target sentence is reconstructed using this bag of words. The target words or phrases in the bag, however, might be enhanced with rich syntactic information that could aid in the reconstruction of the target sentence. This approach to lexical selection and sentence reconstruction has the potential to circumvent the limitations of word-alignment based methods for translation between significantly different word order languages (English-Japanese, for example).

Figure 1:
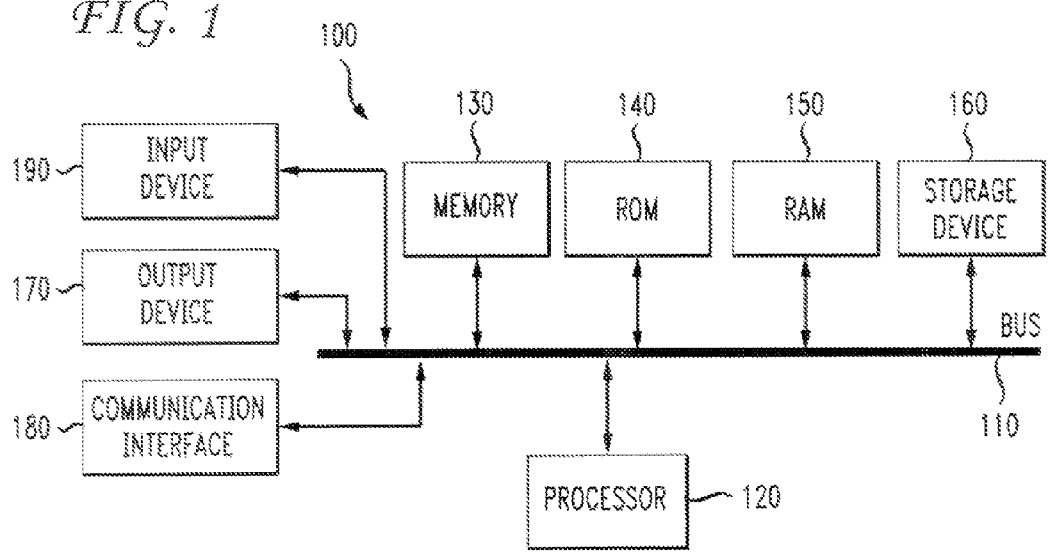
FIG. 1 illustrates an example system embodiment of the invention.

Next the disclosure discusses the basic hardware components in a system embodiment of the invention. With reference to FIG. 1, an exemplary system is shown for implementing the invention includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the invention may operate on a computing device with more than one CPU 120 or on a group or cluster of computing devices networked together to provide greater processing capability. The system bus 110 may be any of several types of bus structures including a memory bus or memory controller, a peripheral bus, and a local bus using any of a variety of bus architectures. A basic input/output (BIOS), containing the basic routine that helps to transfer information between elements within the computing device 100, such as during start-up, is typically stored in ROM 140. The computing device 100 further includes storage means such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech and so forth. The input may be used by the presenter to indicate the beginning of a speech search query. The device output 170 can also be one or more of a number of output means. In some instances, multimodal systems enable a user to provide multiple types of input to communicate with the computing device 100. The communications interface 180 generally governs and manages the user input and system output. There is no restriction on the invention operating on any particular hardware arrangement and therefore the basic features here may easily be substituted for improved hardware or firmware arrangements as they are developed.

For clarity of explanation, the illustrative embodiment of the present invention is presented as comprising individual functional blocks (including functional blocks labeled as a "processor"). The functions these blocks represent may be provided through the use of either shared or dedicated hardware, including, but not limited to, hardware capable of executing software. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided. Thus, a "module" may comprise a combination of software and the associated hardware components controlled by the software to perform certain functions.

The present disclosure presents the details of training a global lexical selection model using classification techniques and sentence reconstruction models using permutation automata. The inventors also present a stochastic finite-state transducer (SFST) as an example of an approach that relies on local associations and use it to compare and contrast their approach.

In the following paragraphs, the inventors first describe in detail the different stages used to train an SFST translation model and discuss the steps in decoding a source input using the trained SFST model. Next, the inventors present the global lexical selection and the sentence reconstruction models. Subsequently, the inventors report the results of the two translation models on a few data sets and contrast the strengths and limitations of the two approaches.

Figure 2:
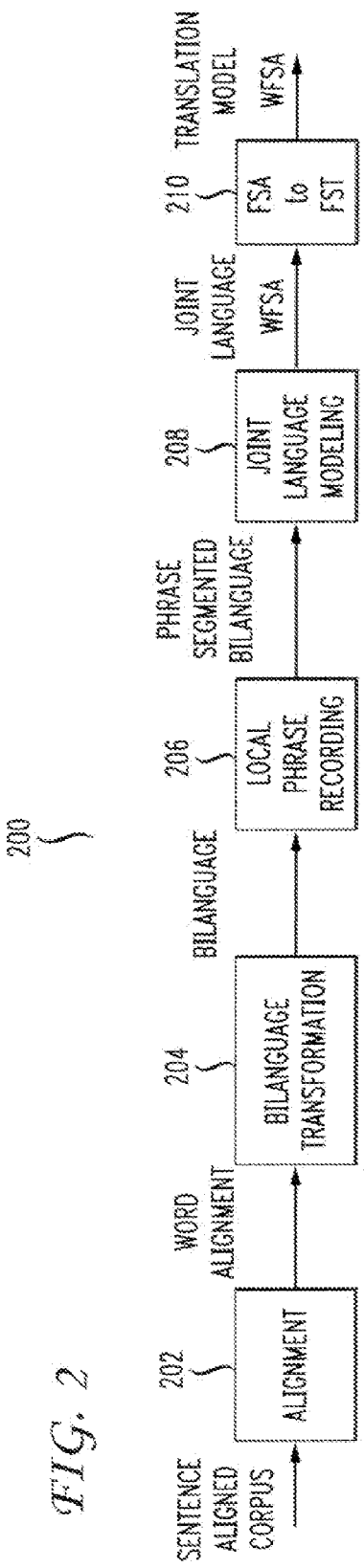
FIG. 2 illustrates a training phase for a stochastic finite-state transducer (SFST) system.

The components of the SFST system shown in FIG. 2 are described in detail below. The first stage in the process of training a lexical selection model for an SFST system is obtaining an alignment function 202 that, given a pair of source $(s_1 s_2 \ldots s_n)$ and target $(t_1 t_2 \ldots t_m)$ language sentences, maps source language word subsequences into target language word subsequences, as shown below.

$$\forall i \exists j (f(s_i) = t_j \lor f(s_j) = \in) \quad (1)$$

The preferred software tools used in connection with the present invention include the GIZA++ tool. See, Och and Ney, "A systematic comparison of various statistical alignment models," *Computational Linguistics*, 29(1):19-51, 2003, incorporate herein by reference. The GIZA++ tool implements a string-alignment algorithm. GIZA++ alignment however is asymmetric in that the word mappings are different depending on the direction of alignment—source-to-target or target-to-source. Other tools may be know to those of skill in the art and may be applied. Hence, in addition to the functions f as shown in Equation 1, the inventors train another alignment function g as shown in Equation 2.

$$\forall j \exists i (g(t_j) = s_i \lor g(t_j) = \in) \quad (2)$$

Figures 4, 5, 6:
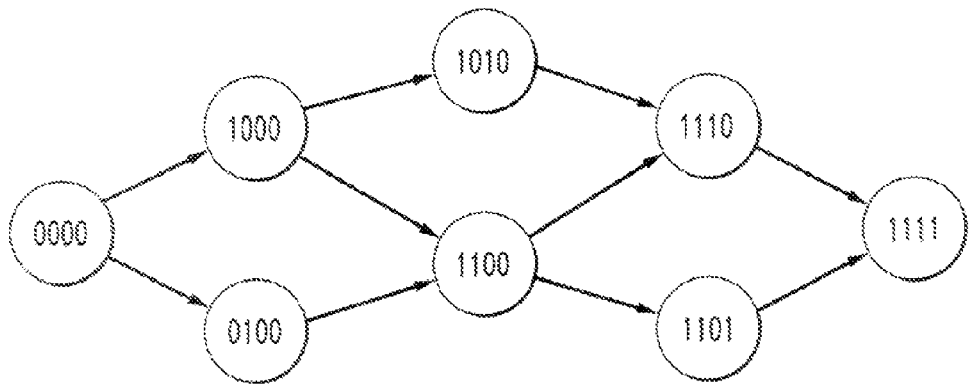
FIG. 4 illustrates example bilingual texts with alignment information.
FIG. 5 illustrates example bilanguage strings resulting from alignments shown in FIG. 2.
FIG. 6 illustrates a locally constrained permutation automaton for a sentence with 4 positions and a window size of 2.

From the alignment information 400 in FIG. 4, the inventors construct a bilanguage representation of each sentence in the bilingual corpus 204. The bilanguage string consists of source-target symbol pair sequences as shown in Equation 3. Note that the tokens of a bilanguage could be either ordered according to the word order of the source language or ordered according to the word order of the target language.

$$B^f = b_1^f b_2^f \ldots b_m^f \quad (3)$$

$$b_i^f = (s_{i-1}; s_i, f(s_i)) \text{ if } f(s_{i-1}) = \in$$

$$= (s_i, f(s_{i-1}); f(s_i)) \text{ if } s_{i-1} = \in$$

$$= (s_i, f(s_i)) \text{ otherwise}$$

FIG. 5 shows an example alignment and the source-word-ordered bilanguage strings 500 corresponding to the alignment shown in FIG. 4.

The inventors also construct a bilanguage using the alignment function g similar to the bilanguage using the alignment function f as shown in Equation 3. Thus, the bilanguage corpus obtained by combining the two alignment functions is $B = B^f \cup B_g$.

While word-to-word translation is only approximating the lexical selection process, phrase-to-phrase mapping 206 can greatly improve the translation of collocations, recurrent strings, etc. Also, the use of phrases allows for reordering of words in the phrase to be in correct target language order, thus solving art of the lexical reordering problem. Moreover, SFSTs can take advantage of the phrasal correlation to improve the computation of the probability $P(W_s, W_T)$.

The bilanguage representation could result in multiple words of the source sentence to be mapped to multiple words of the target sentence as a consequence of some words being aligned to $\in$. In addition to these phrases, the inventors compute subsequences of a given length k on the bilanguage string and for each subsequence the inventors reorder the target words of the subsequence to be in the same order as they are in the target language sentence corresponding to that bilanguage string. This results in a retokenization of the bilanguage where some tokens are source-target word pairs and others are source-target phrase or sentence pairs.

From the bilanguage corpus B, the inventors train a n-gram language model using language modeling tools 208. See, e.g., Goffin, Allauzen, Bocchieri, Hakkani-Tur, Ljolje, Parthasarathy, Rahim, Riccardi, and Saraclar, "The AT&T WATSON Speech Recognizer," *Proceedings of ICASSP*, 2005; and Stolcke, "SRILM—An Extensible Language Modeling Toolkit," *Proc. Intl Conf. Spoken Language Processing*, 2002, incorporated herein by reference. The resulting language model is represented as a weighted finite-state automaton (S×T [0, 1]). The symbols on the arcs of this automaton $(s_i \_ t_i)$ are interpreted as having the source and target symbols $(s_i : t_i)$, making it into a weighted finite-state transducer (S→T×[0,1]) that provides a weighted string-to-string transduction from S into T (as shown in the Equation below).

$$T^* = \underset{T}{\operatorname{argmax}}^- P(s_i, t_i \mid s_{i-1}, t_{i-1} \ldots s_{i-n-1}, t_{i-n-1})$$

Next, the inventors describe the decoding process and the global reordering process 210 for the SFST system in detail. Since the inventors represent the translation model as a weighted finite state transducer, the decoding process of translating a new source input (sentence or weighted lattice) amounts to a transducer composition and selection of the best probability path resulting from the composition, as is shown in Equation 4.

$$T^* = \pi_1(\text{BestPath}(I_s \circ \text{TransFST})) \quad (4)$$

However, on the development corpus, the resulting target sentence is typically shorter than the intended target sentence. This mismatch may be due to the incorrect estimation of the back-off events and their probabilities in the training phase of the transducer. In order to alleviate this mismatch, the inventors introduce a negative word insertion penalty model as a mechanism to produce more words in the target sentence.

Figure 3:
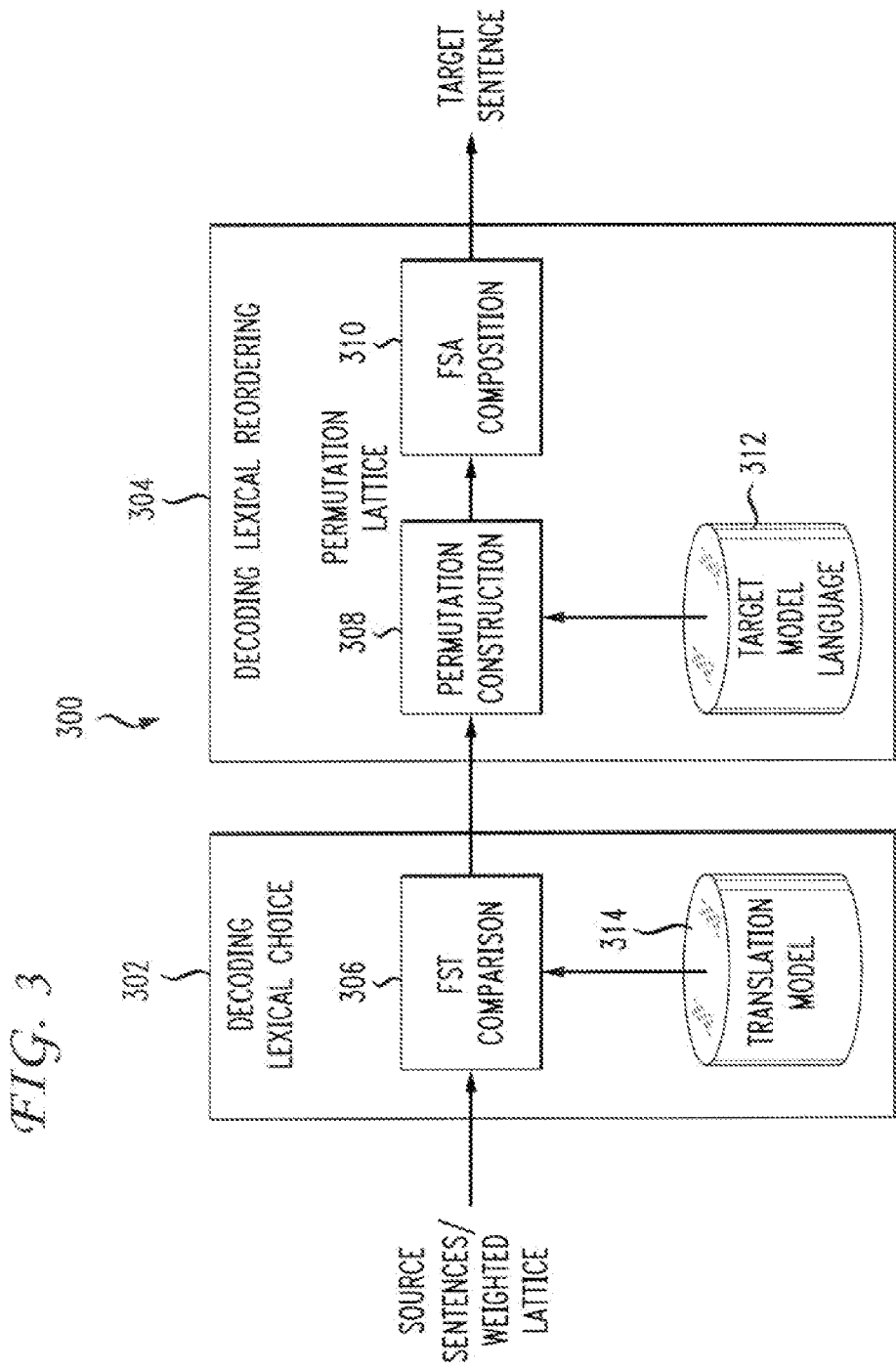
FIG. 3 illustrates a decoding phase for a SFST system.

The word insertion model 302 shown in FIG. 3 is also encoded as a weighted finite-state automaton and is included in the decoding sequence as shown in Equation 5. The word insertion FST 306 has one state and $|\Sigma_T|$ number of arcs each weighted with a λ weight representing the word insertion cost. One composition is shown in Equation 5, wherein the word insertion model 314 penalizes or rewards paths which have more words depending on whether λ is positive or negative value.

$$T^* = \pi_1(\text{BestPath}(I_s \circ \text{TransFST} \circ \text{WIP})) \quad (5)$$

Local reordering 304 as described above is restricted by the window size k and accounts only for different word order within phrases. As permuting non-linear automata is too complex, the inventors apply global reordering by permuting the words of the best translation 308 and weighting the result by an n-gram language model 312 as in Equation 6:

$$T^* = \text{BESTPath}(\text{perm}(T') \circ LM_t) \quad (6)$$

Unfortunately, even the size of the minimal permutation automaton of linear automata grows exponentially with the length of the input sequence. While decoding by composition 310 simply resembles the principle of memorization (i.e. in this case: all state hypotheses necessary to decode a whole sentence are kept in memory), it is necessary to either use heuristic forward pruning or constrain permutations to be within a local window of adjustable size (see Kanthak et al., 2005). The inventors have chosen to constrain permutations. FIG. 6 shows the resulting minimal permutation automaton 600 for an input sequence of 4 words and a window size of 2.

Decoding ASR output in combination with global reordering uses either n-best lists or extracts n-best lists from lattices first. Decoding using global reordering is performed for each entry of the n-best list separately and the best decoded target sentence is picked from the union of the n intermediate results.

The approach presented above is a generative model for statistical machine translation relying on local (phrasal) associations between the source and target sentences. Next, the present disclosure discusses the approach for a global lexical selection model which is based on discriminatively trained classification techniques. Discriminant modeling techniques have become the dominant method for resolving ambiguity in speech and natural language processing tasks, outperforming generative models for the same task but not directly to train the parameters of a model. See, e.g., Och and Ney, "Discriminative training and maximum entropy models for statistical machine translation," *Proceedings of ACL*, 2002, incorporated herein by reference. The inventors expect the discriminatively trained global lexical selection models to outperform generatively trained local lexical selection models as well as provide a framework for incorporating rich morpho-syntactic information.

Statistical machine translation can be formulated as a search for the best target sequence that maximizes P (T\S), where S is the source sentence and T is the target sentence. Ideally, P (T\S) should be estimated directly to maximize the conditional likelihood on the training data (discriminant model). However, T corresponds to a sequence with a exponentially large combination of possible labels, and traditional classification approaches cannot be used directly. Although Conditional Random Fields (CRF) train an exponential model at the sequence level, in translation tasks such as ours, the computational requirements of training such models are prohibitively expensive. For an example, on CRFs see Lafferty, McCallum, and Pereira, "Conditional random fields: Probabilistic models for segmenting and labeling sequence data," *Proceedings of ICML*, 2001.

The inventors investigate two approaches to approximating the string level global classification problem, using different independence assumptions. A comparison of the two approaches is summarized in Table 1.

TABLE 1

|  | Sequential Lexical Model | Bag-of-Words Lexical Model |
| --- | --- | --- |
| Output target | Target word for each source position i | Target word given a source sentence |
| Input features | BOgram (S, i − d, i + d): bag of n-grams in source sentence in the interval [i − d, i + d] | BOgram (S, 0 \|S\|): bag of n-grams in source sentence |
| Probabilities | p ($t_i$ \|BOgram (S, i − d, i + d)) Independence assumption between the labels | P(BOW(T) \|BOgram (S,0, \|S\|)) |
| Number of classes | One per target word or phrase | |
| Training samples | One per source token | One per sentence |
| Preprocessing | Source/Target word alignment | Source/Target sentence alignment |

In the first approach, the inventors formulate a sequential local classification problem as shown in Equation 7. This approach is similar to the SFST approach in that it relies on local associations between the source and target words (phrases). A conditional model (instead of a joint model as before) can be used and the parameters are determined using discriminant training which allows for richer conditioning context.

$$P(T \mid S) = \prod_i P(t_i \mid \Phi(S, i)) \qquad (7)$$

where $\Phi.(S,i)$ is a set of features extracted from the source string S (herein shortened as $\Phi$).

The sequential lexical choice model described above treats the selection of a lexical choice for a source word in the local lexical context as a classification task. The data for training such models is derived from the word alignment corpus obtained from alignment algorithms such as GIZA++. The decoded target lexical items have to be further reordered, but for closely related languages the reordering could be incorporated into correctly ordered target phrases or sentences as discussed previously.

For pairs of languages with radically different word order (e.g. English-Japanese), there needs to be a global reordering of words similar to the case in the SFST-based translation system. Also, for such differing language pairs, the alignment algorithms such as GIZA++ may not perform as well.

These observations prompted the inventors to formulate the lexical choice problem without the need for word alignment information. The inventors require a sentence aligned corpus as before, but the inventors treat the target sentence as a bag-of-words (BOW) assigned to the source sentence. The goal is, given a source sentence, to estimate the probability that a given word is found in the target sentence. This is why, instead of producing a target sentence, what is initially obtained is a target bag of words. Each word in the target vocabulary is detected independently, illustrating a very simple use of binary static classifiers. Training sentence pairs are considered as positive examples when the word appears in the target, and negative otherwise. Thus, the number of training examples equals the number of sentence pairs, in contrast to the sequential lexical choice model which has one training example for each token in the bilingual training corpus. The classifier is trained with n-gram features (BOgrams (S)) from the source sentence. During decoding, the words with conditional probability greater than a threshold $\theta$ are considered as the result of lexical choice decoding.

$$BOW_T^* = \{t \mid P(t \mid BOgrams(S) > \theta\} \qquad (8)$$

In order to reconstruct the proper order of words in the target sentence the inventors consider all permutations of words in $^{BOWT*}$, and weight them by a target language model. This step is similar to the one described above in relation to the SFST and the inventors indeed use the same implementation here.

The bag-of-words approach can also be modified to allow for length adjustments of target sentences, if optional deletions are added in the final step of permutation decoding. The parameter $\theta$ and an additional word deletion penalty can then be used to adjust the length of translated outputs.

Next, the present disclosure discusses the choice of the classification technique. One technique that yields good performance while scaling well is binary Maxent with L1-regularization. Other classification approaches such as Support Vector Machines, Decision Trees, Boosting may also be used.

The sequential and BOW models represent two different classification problems. In the sequential model, a multiclass problem exists where each class $t_i$ is exclusive, therefore, all the classifier outputs $P(t_i|\Phi)$ must be jointly optimized such that $\Sigma_i P(t_i|\Phi)=1$. This can be problematic: with one classifier per word in the vocabulary, even allocating the memory during training may exceed the memory capacity of current computers.

On the other hand, in the BOW model, each class can be detected independently, and two different classes can be detected at the same time. This is known as the 1-vs-other scheme. The key advantage over the multiclass scheme is that not all classifiers have to reside in the memory at the same time during training. This also allows for parallelization. Fortunately for the sequential model, a multiclass classification problem can be decomposed into separate 1-vs-other problems. In theory, one has to make an additional independence assumption and the problem statement becomes different. Each output label t is projected into a bit string with components $b_j(t)$ where probability of each component is estimated independently:

$$P(b_j(t)|\Phi) = 1 - P(\overline{b}_j(t)|\Phi) = \frac{1}{1+e^{-(\lambda_j - \lambda_j)\cdot\Phi}}$$

In practice, despite the approximation, the 1-vs-other scheme has been shown to perform as well as the multiclass scheme. See, e.g., Rifkin and Klautau, "In defense of one-vs-all classification," *Journal of Machine Learning Research*, pages 101-141, 2004, incorporated herein by reference. As a consequence, the inventors prefer to use the same type of binary classifier for the sequential and the BOW models.

The excellent results recently obtained with the SEARN algorithm also suggest that binary classifiers, when properly trained and combined, seem to be capable of matching more complex structured output approaches. For the results of the SEARN algorithm, see Daume, Langford, and Marcu, "Search-based structure prediction," *Machine Learning Journal*, 2007, incorporated herein by reference.

The most popular classification techniques fall into two broad categories. The first category is the geometric approach which maximizes the width of a separation margin between the classes. The most popular method is the Support Vector Machine (SVM). See, e.g., Vapnik, *Statistical Learning Theory*, 1998, incorporated herein by reference.

The second category is the probabilistic approach, which maximizes the conditional likelihood of the output class given the input features. This logistic regression is also called Maxent as it finds the distribution with maximum entropy that properly estimates the average of each feature over the training data. See, e.g., Berger, Pietra, Pietra, and Vincent, "A Maximum Entropy Approach to Natural Language Processing," *Computational Linguistics*, 22(1): 39-71, 1996, incorporated herein by reference.

In previous studies, the inventors found that the best accuracy is achieved with non-linear (or kernel) SVMs, at the expense of a high test time complexity, which is unacceptable for machine translation. Linear SVMs and regularized Maxent yield similar performance. In theory, Maxent training, which scales linearly with the number of examples, is faster than SVM training, which scales quadratically with the number of examples. Note that with recent SVM training algorithms that are linear or optimized for sparse data, SVM training time may no longer be a major issue, even with millions of examples. For an example SVM training algorithm that is linear, see Joachims, "Training Linear SVMs in Linear Time, *Presented at the Learning Workshop*, Snowbird, Utah, to be published, 2006, incorporated herein by reference. For an example SVM training algorithm that is optimized for sparse data, see Haffner, "Fast transpose methods for kernel learning or sparse data," *ICML '06: Proceedings of the 23$^{rd}$ international conference on Machine learning*, pages 385-392, 2006, incorporated herein by reference. In the inventors' first experiments with lexical choice models, the inventors observed that Maxent slightly outperformed SVMs. Using a single threshold with SVMs, some classes of words were over-detected. This suggests that, as theory predicts, SVMs do not properly approximate the posterior probability. The inventors therefore chose to use Maxent as the best probability approximator.

Traditionally, Maxent is regularized by imposing a Gaussian prior on each weight: this L2 regularization finds the solution with the smallest possible weights. However, on tasks like machine translation with a very large number of input features, a Laplacian L1 regularization that also attempts to maximize the number of zero weights is highly desirable.

A new L1-regularized Maxent algorithm was proposed for density estimation. See Dudik, Philips, and Schapire, "Performance Guarantees for Regularized Maximum Entropy Density Estimation," *Proceedings of COLT'04*, 2004, incorporated herein by reference. The inventors adapted it to classification. The inventors found this algorithm to converge faster than the current state-of-the-art in Maxent training, which is L2-regularized L-BFGS. See Malouf, "A comparison of algorithms for maximum entropy parameter estimation," *Proceedings of CoNLL-2002*, pages 49-55, 2002, incorporated herein by reference. Moreover, the number of trained parameters is considerably smaller.

The L1 regularization used by the inventors is derived through convex duality from a slack added to each feature and comes with a principled method to estimate the regularization meta-parameter for each feature, so that no cross-validation is needed.

Figure 8:
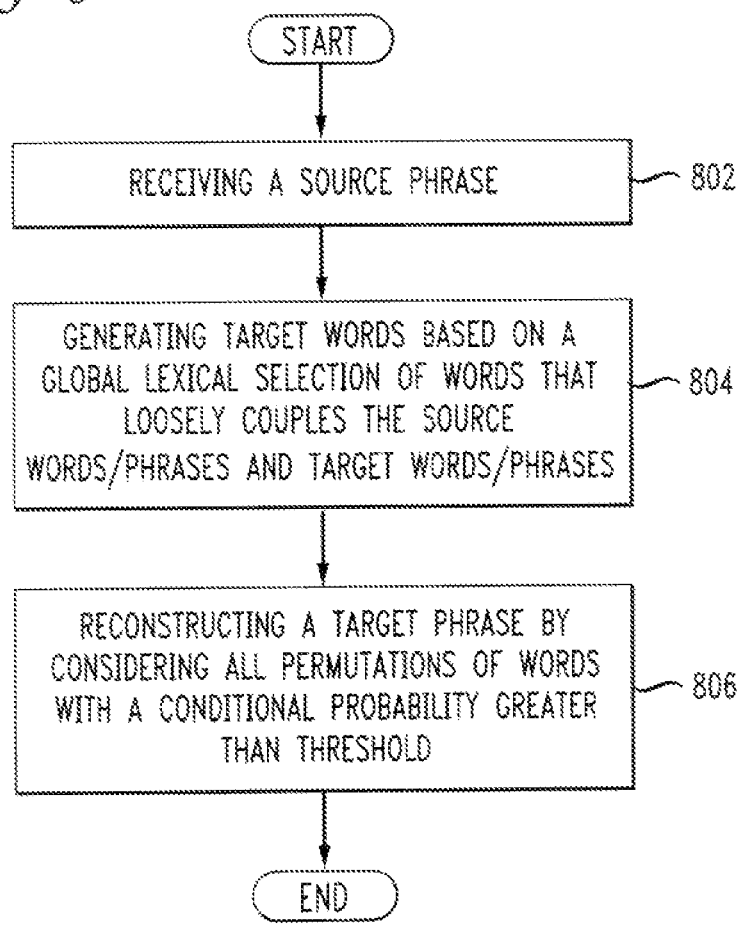
FIG. 8 illustrates a method embodiment of the invention.

An exemplary method embodiment of the invention is illustrated in FIG. 8. In this figure, a method of machine translation from a source language to a target language comprises the steps of receiving a source phrase (802), generating target words based on a global lexical selection of words that loosely couples the source words/phrases and target words/phrases (804), and reconstructing target phrase or sentence based on a global lexical selection of words that loosely couples the source words/phrases and target words/phrases (806). The generated target words may be the "bag of words" discussed above. Reconstructing the target sentence involves computing permutations of the words and weighting the permutations by a target language model. Furthermore, each word in the target bag of words may be detected independently. The length of the target phrase or sentence can be adjusted by adding optional deletions when considering all permutations of words and/or adjusting the threshold for selecting the words to be included in the bag. The target bag of words may be chosen without word alignment information. The system embodiment comprises of modules that utilize software programmed in ways known to those of skill in the art to control associated hardware components to perform steps similar to those of the method embodiment.

The inventors have performed experiments on the IWSLT06 (International Workshop on Spoken Language Translation) Chinese-English training and development sets from 2005 and 2006. The data are traveler task expressions such as seeking directions, expressions in restaurants and travel reservations. Table 2 presents some statistics on the data sets. It must be noted that while the 2005 development set matches the training data closely, the 2006 development set has been collected separately and shows slightly different statistics for average sentence length, vocabulary size and out-of-vocabulary words. Also the 2006 development set contains no punctuation marks in Chinese, but the corresponding English translations have punctuation marks. The inventors also evaluated their models on the speech recognition output and the inventors report results on the 1-best output of the speech recognizer. The 1-best Chinese speech recognition word error rate is 25.2%.

TABLE 2

|  | Training | | Dev 2005 | | Dev 2006 | |
| --- | --- | --- | --- | --- | --- | --- |
|  | Chinese | English | Chinese | English | Chinese | English |
| Sentences | 46,311 | | 506 | | 489 | |
| Running Words | 351,060 | 376,615 | 3,826 | 3,897 | 5,214 | 6,362* |
| Vocabulary | 11,178 | 11,232 | 931 | 898 | 1,136 | 1,134* |
| Singletons | 4,348 | 4,866 | 600 | 538 | 619 | 574* |
| OOVs [%] | — | — | 0.6 | 0.3 | 0.9 | 1.0 |
| ASR WER [%] | — | — | — | — | 25.2 | — |
| Perplexity | — | — | 33 | — | 86 | — |
| # References | — | — | 16 | | 7 | |

For the experiments, the inventors tokenized the Chinese sentences into character strings and trained the models discussed in the previous sections. Also, the inventors trained a punctuation prediction model using Maxent framework on the Chinese character strings in order to insert punctuation marks into the 2006 development data set. The resulting character string with punctuation marks is used as input to the translation decoder. For the 2005 development set, punctuation insertion was not needed since the Chinese sentences already had the true punctuation marks.

In Table 3, the inventors present the results of the three different translation models—FST, Sequential Maxent and Bag-of-words Maxent—on the data described above. There are a few interesting observations that can be made based on these results. First, on the 2005 development set, the sequential Maxent model outperforms the FST model, even though the two models were trained starting from the same GIZA++ alignment. The difference, however, is due to the fact that Maxent models can cope with increased lexical context and the parameters of the model are discriminatively trained. The more surprising result is that the bag-of-words Maxent model significantly outperforms the sequence Maxent model. The reason is that the sequence Maxent model relies on the word alignment, which, if erroneous, results in incorrect predictions by the sequential Maxent model. The bag-of-words model, on the other hand does not rely on the word-level alignment and can be interpreted as a discriminatively trained model of dictionary lookup for a target word in the context of a source sentence.

TABLE 3

|  | Dev 2005 | Dev 2006 | |
| --- | --- | --- | --- |
|  | Text | Text | ASR 1-best |
| FST | 51.8 | 19.5 | 16.5 |
| SeqMaxEnt | 53.5 | 19.4 | 16.3 |
| BOWMaxEnt | 59.9 | 19.3 | 16.6 |

The second set of observations relate to the difference in performance between 2005 development set and 2006 development set. As indicated in the data release document, the 2006 set was collected in a very different manner compared to the 2005 set. As a consequence, the mismatch between the training set and 2006 development set in terms of lexical and syntactic difference can be seen precipitating the lower performance. Due to this mismatch, the performance of the Maxent models are not very different from the FST model; indicating the lack of good generalization across different genres. The inventors however believe that the Maxent framework allows for incorporation of linguistic features that could potentially help in generalization across genres. For translation of ASR 1-best, a systematic degradation of about 3% in mBLEU score compared to translating the transcription occurs.

In order to compensate for this mismatch between the 2005 and 2006 data sets, the inventors computed a 10-fold average mBLEU score by including 90% of the 2006 development set into the training set and using 10% for testing each time. The average mBLEU score across these 10 runs increased to 22.8.

Figure 7:
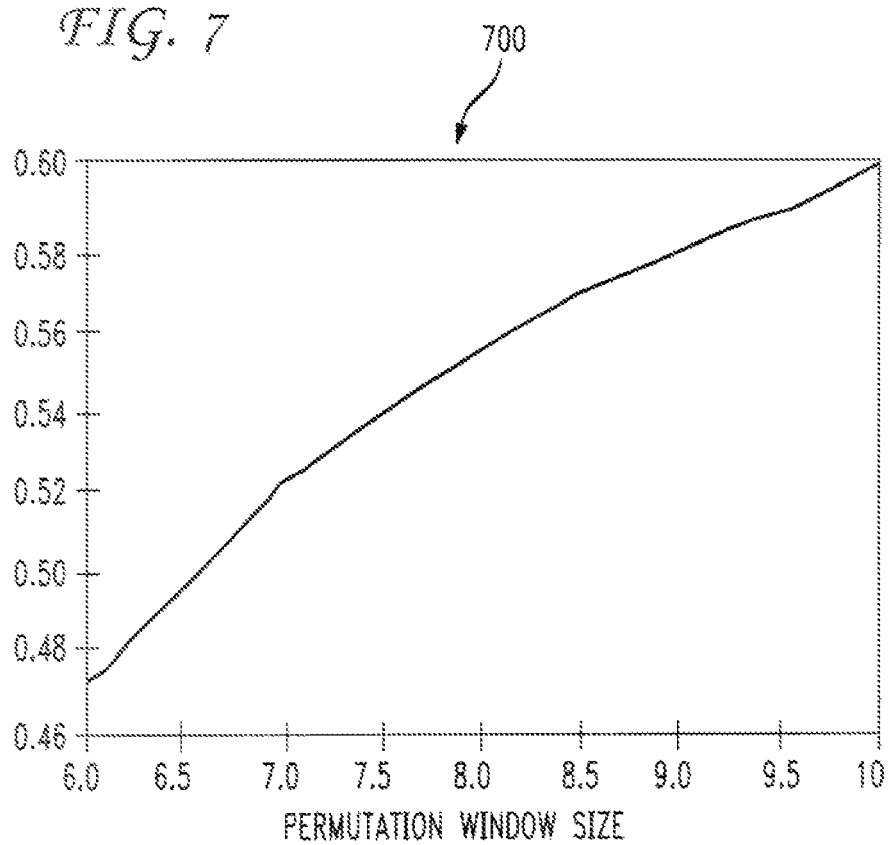
FIG. 7 illustrates an improvement in mBLEU score with the increase in size of the permutation window.

FIG. 7 shows the improvement of the mBLEU score with the increase in the permutation window sizes 700. The inventors had to limit to a permute window size of 12 due to memory limitations, even though the curve has not plateaued. The inventors anticipate using pruning techniques the inventors can increase the window size further.

The bag-of-words approach is very promising because it performs reasonably well despite considerable and easy to identify losses in the transfer of information between the source and the target. The first and most obvious loss is word position. The only information the inventors currently use to restore the target word position is the target language model. However, other information may be incorporated into the process. The information about the grammatical role of a word in the source sentence is completely lost. The language model might fortuitously recover this information if the sentence with the correct grammatical role for the word happens to be the maximum likelihood sentence in the permutation automaton.

The inventors also contemplate incorporating syntactic information on the target words so as to be able to recover some of the grammatical role information lost in the classification process. In experiments, the inventors have associated the target lexical items with supertag information. See, e.g., Bangalore and Joshi, "Supertagging: An approach to almost parsing," *Computational Linguistics,* 25(2), 1999, incorporated herein by reference. Supertags are labels that provide linear ordering constraints as well as grammatical relation information. Although associating supertags to target words increases the class set for the classifier, the inventors have noticed that there is some degradation in the F-score across different corpora. The supertag information can then be exploited in the sentence construction process. The use of supertags in phrase-based SMT system has been shown to improve results. See, e.g., Hassan, Hearne, Sima'an, and Way, "Syntactic phrase-based statistical machine translation," *Proceedings of IEEE/ACL first International Workshop on Spoken Language Technology*, 2006, incorporated herein.

A less obvious loss is the number of times a word or concept appears in the target sentence. Function words like "the" and "of" can appear many times in an English sentence. In the model discussed above, the inventors index each occurrence of the function word with a counter. In order to improve this method, the inventors contemplate a technique where the function words serve as attributes (e.g. definiteness, tense, case) on the contentful lexical items, thus enriching the lexical item with morphosyntactic information.

A third issue related to the bag-of-words model is synonyms—target words which translate the same source word. Suppose that in the training data, target words $t_1$ and $t_2$ are, with equal probability, translations of the same source word. Then, in the presence of this source word, the probability to detect the corresponding target word, which is normally 0.8 (the inventors assume some noise), will be, because of discriminant learning, split equally between $t_1$ and $t_2$, that is 0.4 and 0.4. Because of this synonym problem, the threshold has to be set lower than 0.5, which is observed experimentally. If the threshold is set too low, such as to 0.3, then a possibility of undesirable insertions occurs.

The BOW approach is different from the parsing based approaches where the translation model tightly couples the syntactic and lexical items of the two languages. For examples on how the BOW approach is different from the parsing approach see See, e.g., Melamed, "Statistical machine translation by parsing," *Proceedings of ACL*, 2004; Zhang and Gildea, "Stochastic lexicalized inversion transduction grammar for alignment," *Proceedings of ACL*, 2005; and Cowan, Kucerova, and Collins, "A discriminative model for tree-to-tree translation," *Proceedings of EMNLP*, 2006, incorporated herein by reference. The decoupling of the two steps in the inventors' model has the potential for generating paraphrased sentences not necessarily isomorphic to the structure of the source sentence.

Machine translation can be viewed as consisting of lexical selection and lexical reordering steps. These two steps need not necessarily be sequential and could be tightly integrated. The description above has presented the weighted finite-state transducer model of machine translation where lexical choice and a limited amount of lexical reordering are tightly integrated into a single transduction. The description above has also presented a novel approach to translation where these two steps are loosely coupled and the parameters of the lexical choice model are discriminatively trained using a maximum entropy model. The lexical reordering model in this approach is achieved using a permutation automaton. The two approaches were evaluated on the 2005 and 2006 IWSLT development sets.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. For example, those of skill in the art will recognize that alternate approaches or proprietary approaches, different from the algorithms referenced above, may be applied. Accordingly, the appended claims and their legal equivalents should only define the invention, rather than any specific examples given

We Claim:

1. A method comprising:
  receiving a source phrase in a source language;
  classifying the source phrase into a phrase meaning;
  matching the phrase meaning to a target phrase automaton in a target language, the target phrase automaton comprising a plurality of states and a plurality of arcs interconnecting the plurality of states to define a sentence path, each of the plurality of states defining a word position slot for inserting a word from a bag of words, and each of the plurality of arcs associated with a predefined insertion cost for inserting the word from the bag of words based on a previous state in the sentence path, wherein the predefined insertion cost has one of a positive and negative value which is associated with one of penalizing and rewarding the sentence path based on how many words are in the sentence path in order to produce more words in a target sentence relative to the source phrase;
  determining, for each word position slot in each target phrase automaton, a target word possibility from the bag of words associated with the word position slot based on at least one of a lexical translation of words in the source phrase and a phrase-to-phrase mapping;

calculating a target sentence probability for the sentence path based at least on the pre-defined insertion cost associated with each of the plurality of arcs for the sentence path; and upon determining that the sentence path has a probability above a threshold, constructing the target sentence using the sentence path.

2. The method of claim 1, wherein the target word possibility for each word position is weighted by a target language model.

3. The method of claim 1, wherein the target word possibility for each word position is detected independently.

4. The method of claim 1, further comprising:

adjusting a length of the target sentence by adding optional deletions when constructing the target sentence.

5. The method of claim 1, wherein the determining for each word position slot of the target word possibility does not use information about previous words and subsequent words.

6. The method of claim 1, wherein function words in the target word possibility of each word position serve as attributes on contentful lexical items.

7. The method of claim 6, wherein the attributes are at least one of definiteness, tenses and case.

8. A system comprising:

a processor; and a computer-readable storage medium storing instructions which, when executed by the processor, cause the processor to perform operations comprising:

receiving a source phrase in a source language;

classifying the source phrase into a phrase meaning;

matching the phrase meaning to a target phrase automaton in a target language, the target phrase automaton comprising a plurality of states and a plurality of arcs interconnecting the plurality of states to define a sentence path, each of the plurality of states defining a word position slot for inserting a word from a bag of words, and each of the plurality of arcs associated with a pre-defined insertion cost for inserting the word from the bag of words based on a previous state in the sentence path, wherein the predefined insertion cost has one of a positive and negative value which is associated with one of penalizing and rewarding the sentence path based on how many words are in the sentence path in order to produce more words in a target sentence relative to the source phrase;

determining, for each word position slot in each target phrase automaton, a target word possibility from the bag of words associated with the word position slot based on at least one of a lexical translation of words in the source phrase and a phrase-to-phrase mapping;

calculating a target sentence probability for the sentence path based at least on the pre-defined insertion cost associated with each of the plurality of arcs for the sentence path; and upon determining that the sentence path has a probability above a threshold, constructing the target sentence using the sentence path.

9. The system of claim 8, wherein the target word possibility for each word position is weighted by a target language model.

10. The system of claim 8, wherein the target word possibility for each word position is detected independently.

11. The system of claim 8, the computer-readable storage medium storing additional instructions which, when executed on the processor, perform a method further comprising:

adjusting a length of the target sentence by adding optional deletions when constructing the target sentence.

12. The system of claim 8, wherein the determining for each word position slot of the target word possibility does not use information about previous words and subsequent words.

13. The system of claim 8, wherein function words in the target word possibility of each word position serve as attributes on contentful lexical items.

14. The system of claim 13, wherein the attributes are at least one of definiteness, tenses and case.

15. A computer-readable storage device having instructions stored which, when executed by a computing device, cause the computing device to perform operations comprising:

receiving a source phrase in a source language;

classifying the source phrase into a phrase meaning;

matching the phrase meaning to a target phrase automaton in a target language, the target phrase automaton comprising a plurality of states and a plurality of arcs interconnecting the plurality of states to define a sentence path, each of the plurality of states defining a word position slot for inserting a word from a bag of words, and each of the plurality of arcs associated with a pre-defined insertion cost for inserting the word from the bag of words based on a previous state in the sentence path, wherein the predefined insertion cost has one of a positive and negative value which is associated with one of penalizing and rewarding the sentence path based on how many words are in the sentence path in order to produce more words in a target sentence relative to the source phrase;

determining, for each word position slot in each target phrase automaton, a target word possibility from the bag of words associated with the word position slot based on at least one of a lexical translation of words in the source phrase and a phrase-to-phrase mapping;

calculating a target sentence probability for the sentence path based at least on the pre-defined insertion cost associated with each of the plurality of arcs for the sentence path; and upon determining that the sentence path has a probability above a threshold, constructing the target sentence using the sentence path.

16. The computer-readable storage device of claim 15, wherein the target word possibility for each word position is weighted by a target language model.

17. The computer-readable storage device of claim 15, wherein the target word possibility for each word position is detected independently.

18. The computer-readable storage device of claim 15, wherein the non-transitory computer-readable medium stores additional instructions which, when executed on the computing device, cause the computing device to perform operations further comprising:

adjusting a length of the target sentence by adding optional deletions when constructing the target sentence.

19. The computer-readable storage device of claim 15, wherein the determining for each word position slot of the target word possibility does not use information about previous words and subsequent words.

20. The computer-readable storage device of claim 15, wherein function words in the target word possibility of each word position serve as attributes on contentful lexical items.

21. The computer-readable storage device of claim 20, wherein the attributes are at least one of definiteness, tenses and case.

* * * * *